Patented Feb. 7, 1950

2,496,670

UNITED STATES PATENT OFFICE 2,496,670

POLYHYDROXYALKYL ETHERS OF CARBOHYDRATE GUMS

Owen A. Moe, Minneapolis, Minn., assignor to General Mills, Inc., a corporation of Delaware No Drawing. Application June 19, 1947, Serial No. 755,707

8 Claims. (Cl. 260—209)

The present invention relates to polyhydroxyalkyl ethers of carbohydrate gums and to a process of producing the same. The present invention is particularly applicable to galactomannan and glucomannan gums. These gums are polysaccharides composed principally of galactose and mannose units, and glucose and mannose units respectively. The galactomannans are usually found in the endosperm of leguminous seeds, such as guar, locust bean, honey locust, flame tree, *Cassia occidentalis*, and the like. The glucomannans, on the other hand, are usually found in the corms of plants of the Araceae family, such as *Amorphophallus oncophyllus*, from which the product known as iles mannan is obtained, and *Amorphophallus rivieri* from which konnyaku flour is obtained.

It has now been found that it is possible to convert these gums into dihydroxypropyl ethers such that they retain dispersibility or solubility in water, and even display cold water dispersibility. One of the properties of gums of this type is their capability of forming gels with borax. This property, which is desirable in many instances, is also found in the dihydroxypropyl ethers, and accordingly the gums have not been adversely affected by the formation of the dihydroxypropyl ether.

When aqueous solutions of these dihydroxypropyl gum ethers are cast on a glass plate and the solvent is permitted to evaporate, films which possess good strength, flexibility and clarity are obtained. When these aqueous solutions are treated with formaldehyde before casting on the glass plate and the resulting film placed in an oven at 100° C. for approximately 4 hours, the films are insoluble in water and adhere firmly to the glass.

In addition to the desirability of these ethers as pointed out above, these compounds also are useful as intermediates in further organic synthesis. For example, it has been found that these ethers may be readily esterified. Polymeric carbohydrates such as these gums are rather difficult to esterify directly. However, when the gums have been converted to their dihydroxypropyl ethers, even though there be only a slight degree of substitution, they are readily esterified in that form by means of conventional esterifying agents.

The dihydroxypropyl ethers may be prepared by the reaction between alkali gum and glycerol monochlorohydrin. It has been discovered that the crude gum endosperms (gum splits) can be employed in the etherification process. Hence, the crude gum endosperms are treated with an aqueous sodium hydroxide solution which removes most of the color, and the endosperms swell appreciably during this alkaline treatment. Washing with water removes the extraneous material such as seed coat and the like. The swollen gum endosperms are then treated with more alkali and etherified in the usual manner. This procedure eliminates the necessity of milling and indicates a very economical process The details of the process will be more readily apparent from the following specific examples.

*Example 1*

Twenty-seven parts of locust bean gum were added to an alkaline solution (cooled to 5° C.), cantaining 13.3 parts of sodium hydroxide and 50 parts of water. After thorough mixing, an additional 150 parts of water were added. The resulting reaction mixture was heated in a water bath for 20 minutes at 65–70° C., when 37 parts of glycerol monochlorohydrin were added with efficient stirring. The resulting reaction mixture was heated in a water bath at 85° C. for a period of two hours. An additional portion of water (100 parts) was added and the heating was continued for an additional hour. After dilution by the addition of water (100–300 parts) and neutralization, the reaction product was isolated by precipitation with methanol, collected and dried. The dihydroxypropyl ether thus obtained was dispersible in cold water, and the aqueous solution gelled when borax was added in a manner very much similar to that noted with the original locust bean gum.

*Example 2*

Twenty parts of guar gum endosperm were mixed with 200 parts of a 10% sodium hydroxide solution. The gum endosperms swelled to an appreciable extent in the alkaline media. After five hours the swollen gum endosperms were washed repeatedly with water in order to flush off the extraneous material and to remove the last traces of color. All of the free water was removed by decantation, and an alkaline solution containing 13.3 parts of sodium hydroxide and 50 parts of water was added. The resulting alkali-gum mixture was heated on a steam bath for two hours with efficient mixing and then permitted to stand overnight at room temperature. This alkali-gum mixture which was a rubbery gel-like material, was ground in a mortar in order to rupture all of the gum endosperms. 30 parts of glycerol monochlorohydrin were then added with efficient mixing, and the resulting mixture was heated at approximately 60° C. for a period of five hours. During the heating period an additional portion of water (100 parts) was added with efficient mixing. At the conclusion of the heating period the reaction mixture was diluted with water, and neutralized to phenolphthalein. The reaction product was precipitated by the addition of methanol and the product was worked up in the previously described manner.

*Example 3*

Twenty-seven parts of powdered iles mannan gum were mixed with an alkaline solution containing 13.3 parts of sodium hydroxide and 50 parts of water. After thorough mixing, 150 parts of water were added and the resulting reaction mixture was heated to 65° C. when it became extremely viscous. After a heating period of 20 minutes, 37 parts of glycerol monochlorohydrin were added with efficient stirring. The heating period was then continued for an additional 105 minutes at 70-5° C. The reaction product was precipitated by dilution with methanol, collected and dried in vacuo. This polyhydroxy alkyl ether of a polymeric glucomannan was readily esterified employing the conventional acetylation baths. In the same way, it was possible to prepare the dihydroxypropyl ether of finely powdered guar and honey locust gums.

It will be apparent that numerous variations are possible in the above procedure. Thus the time, temperature, ratio of reactants, and the concentration of reactants will affect the degree of substitution obtained. It is thus possible to control the etherification so as to produce products of any desired degree of substitution or any desired degree of dispersibility. While various modifications have been described, it will be apparent that other variations are possible, and it is to be understood that the invention is not limited thereto, but may be varied within the scope of the following claims.

I claim as my invention:

1. A dihydroxypropyl ether of a gum selected from the group consisting of glucomannan and galactomannan gums.

2. A dihydroxypropyl ether of a glucomannan gum.

3. A dihydroxypropyl ether of a galactomannan gum.

4. A dihydroxypropyl ether of guar gum.

5. A dihydroxypropyl ether of carob bean gum.

6. A dihydroxypropyl ether of iles mannan gum.

7. Process of producing dihydroxypropyl ethers of a gum selected from the group consisting of glucomannan and galactomannan gums which comprises treating said gum with a strong alkali and then reacting the alkali gum with glycerol monohalohydrin.

8. Process of producing dihydroxypropyl ethers of a gum selected from the group consisting of glucomannan and galactomannan gums which comprises treating said gum with a strong alkali and then reacting the alkali gum with glycerol monochlorohydrin.

OWEN A. MOE.

REFERENCES CITED

The following references are of record in the file of this patent:

UNITED STATES PATENTS

| Number | Name | Date |
|---|---|---|
| 2,116,867 | Kreimeier et al. | May 10, 1938 |
| 2,190,179 | Ziese et al. | Feb. 13, 1940 |